July 22, 1941.  C. V. BERGLUND  2,250,248

BRAKE

Filed May 1, 1939

INVENTOR.
CHARLES V. BERGLUND
BY
C. H. Fowler
ATTORNEY.

Patented July 22, 1941

2,250,248

UNITED STATES PATENT OFFICE 2,250,248

BRAKE

Charles V. Berglund, Detroit, Mich., assignor to Hydraulic Brake Company, Detroit, Mich., a corporation of California Application May 1, 1939, Serial No. 271,182

9 Claims. (Cl. 188—152)

This invention relates to brakes, and more particularly to brakes for motor vehicles.

An object of the invention is to provide a brake including a plurality of friction elements, and means for actuating the elements with equal force and effectiveness in both forward and reverse braking.

Another object of the invention is to provide a brake including a pair of friction elements, and actuating means therefor operative to apply force to one end of each element in one direction of braking, and to one end of one element and both ends of the other element in another direction of braking.

Other objects of the invention will appear from the following description taken in connection with the drawing forming a part of this specification, and in which—

Figure 1:
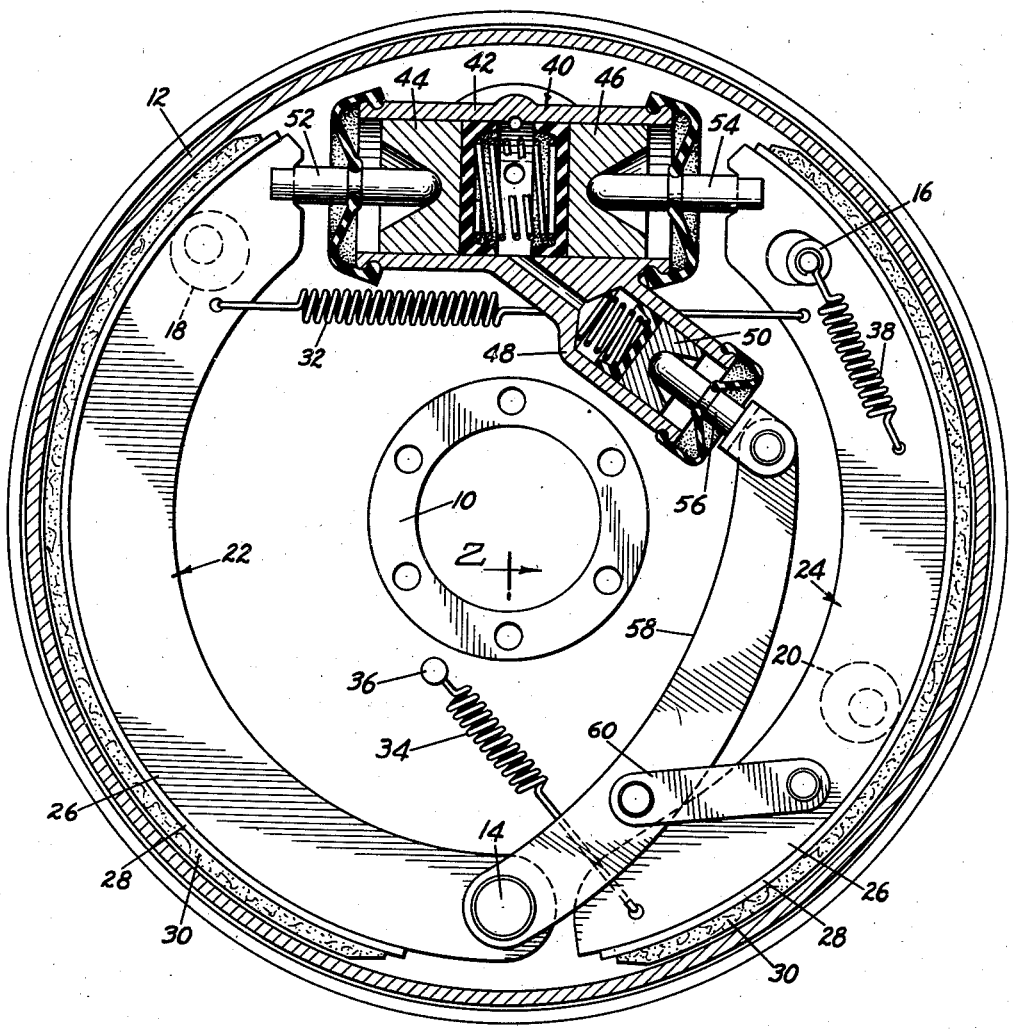
Fig. 1 is a vertical sectional view of a brake embodying the invention.
Figure 2:
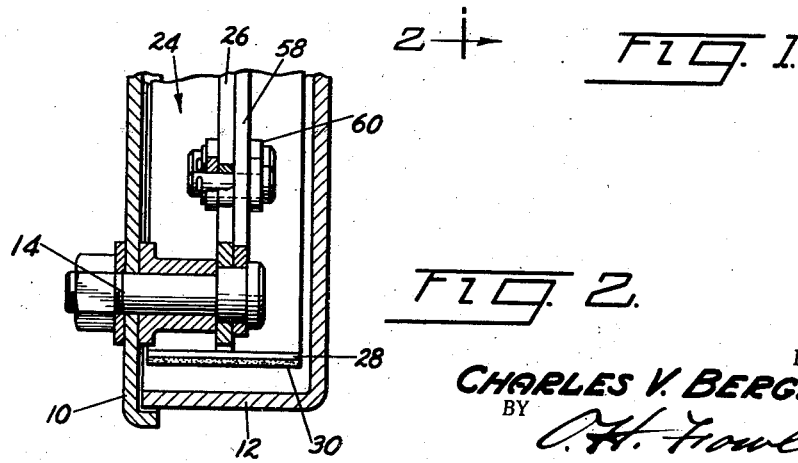
Fig. 2 is a sectional view taken substantially on line 2—2, Fig. 1.

Referring to the drawing for more specific details of the invention, 10 represents a fixed support or backing plate adapted to be secured to an axle or to an axle housing. Associated with the backing plate is a rotatable drum 12, adapted to be secured to a wheel, and suitably arranged on the backing plate are fixed anchors 14 and 16 and also adjustable retractile stops 18 and 20.

A pair of friction elements or shoes 22 and 24 are mounted in tandem on the anchors 14 and 16. The shoe 22 is pivotally mounted on the anchor 14, and the shoe 24 is shiftably mounted on the anchor 16, and the retractile stops 18 and 20 support the shoes 22 and 24 respectively, when in retracted position, in proper spaced relation to the drum. The shoes may be of any conventional type. Preferably each of the shoes includes a web 26 supporting a rim 28 having secured thereto a friction lining 30 for cooperation with the drum 12.

A retractile spring 32 connects the shoe 22 adjacent its unanchored end to the shoe 24 adjacent its anchored end, a retractile spring 34 connects the shoe 24 adjacent its unanchored end to a fixed support 36 on the backing plate 10, and a retractile spring 38 connects the shoe 24 to the anchor 16. These springs serve to retract the shoes upon conclusion of a braking operation and to retain the shoes on the retractile stops when in their retracted position.

A fluid pressure actuated motor 40 mounted on the backing plate 10 between the shoes and adapted to be connected to a suitable source of fluid pressure includes a high pressure cylinder 42 having therein opposed pistons 44 and 46, and an auxiliary relatively low pressure cylinder 48 having therein a piston 50. The piston 44 is connected by a thrust pin 52 to the unanchored end of the shoe 22, the piston 46 is connected by a thrust pin 54 to the shiftably anchored end of the shoe 24, and the piston 50 is connected by a thrust pin 56 to the force applying end of a lever 58 fulcrumed on the anchor 14 and connected adjacent its fulcrumed end by a link 60 to the shoe 24 adjacent its unanchored end.

During forward braking operation, upon energization of the motor 40, the piston 44 is moved on its compression stroke and force is transmitted from the piston through the thrust pin 52 to the shoe 22, resulting in actuation of the shoe into engagement with the drum against the resistance of the spring 32. Because of the load on the spring 38 connecting the shoe 24 to the anchor 16, the shoe 24 does not leave its anchor, hence the piston 46 is held against movement.

Simultaneously with this operation, the piston 50 is actuated and force is transmitted therefrom through the thrust pin 56 to the force applying end of the lever 58, and from this lever through the link 60 to the unanchored end of the shoe 24, resulting in actuation of this shoe into engagement with the drum against the resistance of the retractile spring 34.

Because of a balance of the forces induced by the pressure on the fluid received on the piston 44 and the piston 50, augmented by the lever 58, the shoes 22 and 24 are actuated with equal force and effectiveness. Upon conclusion of a forward braking operation, the shoes and motor are returned to retracted position under the influence of the retractile springs 32 and 34.

During a reverse braking operation, upon energization of the motor 40, the pistons 44, 46 and 50 are actuated concomitantly. Upon actuation of the piston 44, force is transmitted therefrom through the thrust pin 52 to the shoe 22, resulting in moving the shoe into engagement with the drum against the resistance of the spring 32. Correspondingly, upon actuation of the piston 46, force is transmitted therefrom through the thrust pin 54 to the shoe 24, resulting in moving this shoe from its anchor 16 into engagement with the drum against the resistance of the spring 38. Simultaneously with this operation, the piston 50 is actuated and force is transmitted therefrom through the thrust pin 56 to the force applying end of the lever 58 and from the lever through the link 60 to the unanchored end of the shoe 24, resulting in movement of this end of the shoe into engagement with the drum against the resistance of the spring 34. The force applied to the shoe 24 is the combined forces acting on the piston 46 and the piston 50 augmented by the force multiplying linkage connecting the piston 50 to the shoe 24. The increase of force applied to the shoe 24 is so proportioned to the force applied to the shoe 22 that the combined effectiveness of the shoes in reverse braking is equal to the effectiveness of the shoes in forward braking. Upon conclusion of a reverse braking operation, the shoes and the motor are returned to retracted position under the influence of the retractile springs.

While this invention has been described in connection with certain specific embodiments, the principle involved is susceptible to numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A brake comprising a fixed support, a rotatable drum associated therewith, a pair of shoes mounted on the support for cooperation with the drum, high pressure actuating means for the shoes for simultaneous actuation thereof, low pressure actuating means and linkage including an anchored lever connecting the last-mentioned means to one of the shoes for actuation thereof simultaneously with the first-mentioned actuating means.

2. A brake comprising a fixed support, a rotatable drum assoicated therewith, a pair of shoes mounted on the support for cooperation with the drum, high pressure actuating means for activating both of the shoes, low pressure actuated means interconnected with the high pressure actuating means, an anchored lever actuated thereby, and a link connecting the lever to one of the shoes.

3. A brake comprising a fixed support, a rotatable drum associated therewith, a pair of shoes mounted in tandem on the support for cooperation with the drum, one of the shoes being pivotally anchored and the other shoe being shiftably anchored, high pressure actuating means for applying activating force to the unanchored end of one shoe and to the shiftably anchored end of the other, a low pressure actuating means interconnected with the high pressure actuating means, a lever pivoted on a fixed support and connected to the low pressure actuating means, and a link connecting the lever to the unanchored end of the shiftably anchored shoe.

4. A brake comprising a fixed support, a rotatable drum associated therewith, a pair of shoes mounted in tandem on the support for cooperation with the drum, one of said shoes being pivotally anchored and the other of said shoes being shiftably anchored, a fluid pressure actuated motor connected to the unanchored end of the pivotally anchored shoe and to the anchored end of the shiftably anchored shoe, an auxiliary fluid pressure actuated motor, a lever mounted on the anchor of the pivotally anchored shoe and adapted to be actuated by the auxiliary motor, and a link connecting the lever to the shiftably anchored shoe.

5. A brake comprising a fixed support, a rotatable drum associated therewith, a brake shoe arranged on the support for cooperation with the drum, a high pressure actuated motor coupled with one end of the shoe, a low pressure actuated motor associated with the high pressure motor, a lever pivoted on the support and coupled with the opposite end of the shoe and with the low pressure motor to be actuated thereby.

6. A brake comprising a fixed support, a pair of shoes arranged thereon, a pivotal anchored lever on the support having a pivoted link attached thereto, a high pressure actuated means for applying force to one end of one shoe, and a low pressure actuated means interconnected with the high pressure actuated means for applying force through the lever and link to the opposite end of the same shoe.

7. A brake comprising a fixed support, a rotatable drum associated therewith, an anchored and a shiftably anchored shoe mounted on the support for cooperation with the drum, an anchor for one of the shoes, a high pressure actuated means for applying equalized forces to both the shoes, a low pressure actuated means interconnected with the high pressure actuated means, an anchored lever connected to the low pressure actuated means, and a pivotal link joining the lever and the shiftably anchored shoe, said low pressure actuated means applying force to the lever, which in turn transmits said force through the link to the shiftably anchored shoe.

8. A brake comprising a fixed support, a rotatable drum associated therewith, a pair of shoes mounted on the support for cooperation with the drum, one of the shoes being anchored and the other shiftably anchored, a fluid pressure actuated motor for applying an equalized force to the adjacent ends of both of the shoes, a lever anchored on the support coupled to the opposite end of the shiftably anchored shoe, and an auxiliary fluid pressure actuated motor connected to the fluid pressure actuated motor for applying additional force through the anchored lever to the shiftably anchored shoe only.

9. A brake comprising a fixed support, a rotatable drum associated therewith, fixed anchors on the suport, a shoe pivoted on one of the anchors for cooperation with the drum, a shiftable shoe on the other anchor for cooperation with the drum, a fluid motor connected to the unanchored end of the anchored shoe and to one end of the shiftable shoe, a pivotally anchored lever coupled to the opposite end of the shiftable shoe, and an auxiliary fluid motor connected to the lever whereby a two-forward-shoe braking operation occurs on forward braking, the shoes anchoring on their respective anchors, and whereby on reverse braking a one-forward-shoe braking action results, the shiftable shoe anchoring on the lever and against the applied force of the auxiliary fluid motor.

CHARLES V. BERGLUND.